United States Patent [19]
Chen

[11] Patent Number: 5,855,822
[45] Date of Patent: Jan. 5, 1999

[54] WATER DISCHARGE MODULE FOR SEMI-CONDUCTOR EXHAUST TREATMENT APPARATUS

[76] Inventor: Tsong-Maw Chen, P.O. Box 82-144, Taipei, Taiwan

[21] Appl. No.: 916,391

[22] Filed: Aug. 22, 1997

[51] Int. Cl.⁶ .................................................. B01D 47/06
[52] U.S. Cl. ............................................. 261/118; 96/243
[58] Field of Search ........................... 55/220, 238, 242; 261/115, 118; 96/228, 243, 308, 311, 319

[56] References Cited

U.S. PATENT DOCUMENTS

| | | | |
|---|---|---|---|
| 228,765 | 6/1880 | Kennedy | 261/118 |
| 537,175 | 4/1895 | Austin | 261/118 |
| 582,108 | 5/1897 | Winton | 261/115 |
| 701,898 | 6/1902 | Larson | 261/115 |
| 725,352 | 4/1903 | McAleer | 261/115 |
| 986,271 | 3/1911 | Dicke | 55/220 |
| 3,009,687 | 11/1961 | Hendriks | 261/118 |
| 3,334,471 | 8/1967 | Herron | 261/115 |
| 3,350,076 | 10/1967 | Crommelin, Jr. | 261/118 |

*Primary Examiner*—C. Scott Bushey
*Attorney, Agent, or Firm*—A & J

[57] ABSTRACT

A water discharge module for semi-conductor exhaust treatment apparatus includes a discharge pipe having a curved pipe body and two orifices respectively connected to a reaction chamber of the module and a bottom end of a posterior filter tank; a water discharge pipe communicating with a central bottom end of the discharge pipe; and two annular nozzles disposed at the two nozzles of the discharge pipe. The nozzles spray water mist inwardly towards the interior of the pipe body. Due to the curved configuration of the pipe body and the nozzles spraying inwardly, there are no dead corners or spots in the pipe body so that exhaust can flow smoothly downwardly and waste water carrying particulates can also flow smoothly downwardly to the water discharge pipe for discharge.

1 Claim, 4 Drawing Sheets

WATER DISCHARGE MODULE FOR SEMI-CONDUCTOR EXHAUST TREATMENT APPARATUS

BACKGROUND OF THE INVENTION

1. Field of the Invention

This invention relates generally to a water discharge module for semi-conductor exhaust treatment apparatus, and more particularly to a water discharge module which ensures that no dead corners or spots are formed in the water discharge module to obstruct smooth flow of exhaust and waste water.

2. Description of the Prior Art

FIG. 1 shows a conventional water discharge module structure of a semi-conductor exhaust treatment apparatus. It essentially comprises a substantially L-shaped discharge pipe seat A connected between a front reaction chamber B1 of the module and a bottom end of a posterior filter tank B2; two water nozzles C1, C2 connectably guided by a fluid duct C3 to a center position between two connecting ends of the discharge pipe seat; and a water discharge pipe communicating with a bottom portion of a lower end of the discharge pipe seat. By means of the above structure, particulates carried in the waste water and water soluble exhaust may be washed down by water spray from the water nozzles during passage through the discharge pipe seat and be discharged along the water discharge pipe end. Although such conventional water discharge module structure can basically accomplish its effects, it has various drawbacks.

With reference to FIG. 2, the L-shaped discharge pipe seat has right-angled corners which may easily become dead corners for air flow. The particulates carried in the waste water and water soluble exhaust will then easily accumulate at the dead corners and finally block the pipeline. Besides, that section of the fluid duct C3 passing through the discharge pipe seat and the water nozzle C1 accommodated therein may also interfere with the smooth flow of air currents to a certain extent, which indirectly leads to the accumulation of particulates.

SUMMARY OF THE INVENTION

This invention relates generally to a water discharge module for semi-conductor exhaust treatment apparatus, and more particularly to a water discharge module which ensures that no dead corners or spots are formed in the water discharge module to obstruct smooth flow of exhaust and waste water.

A primary object of the present invention is to eliminate the drawbacks with the prior art by providing an improved water discharge module for semi-conductor exhaust treatment apparatus, which comprises a curved discharge pipe having two orifices which are respectively connected to a front reaction chamber and a bottom end of a posterior filter tank of the module; a water discharge pipe communicating with a bottom center portion of the discharge pipe; and two annular nozzles respectively fitted at the orifices of the discharge pipe; whereby the annular nozzles spray water from the outer side to the inner side, preventing forming of dead corners when exhaust flow past the discharge pipe, further preventing particulates in the waste water from accumulating at the dead corners to block the pipeline.

Another object of the present invention is to provide an improved water discharge module for semi-conductor exhaust treatment apparatus in which the annular nozzles each have at least one water outlet which communicates with the discharge pipe so that the annular nozzles may spray from the outer side to the inner side.

DETAILED DESCRIPTION OF THE PREFERRED EMBODIMENT

Figure 1:
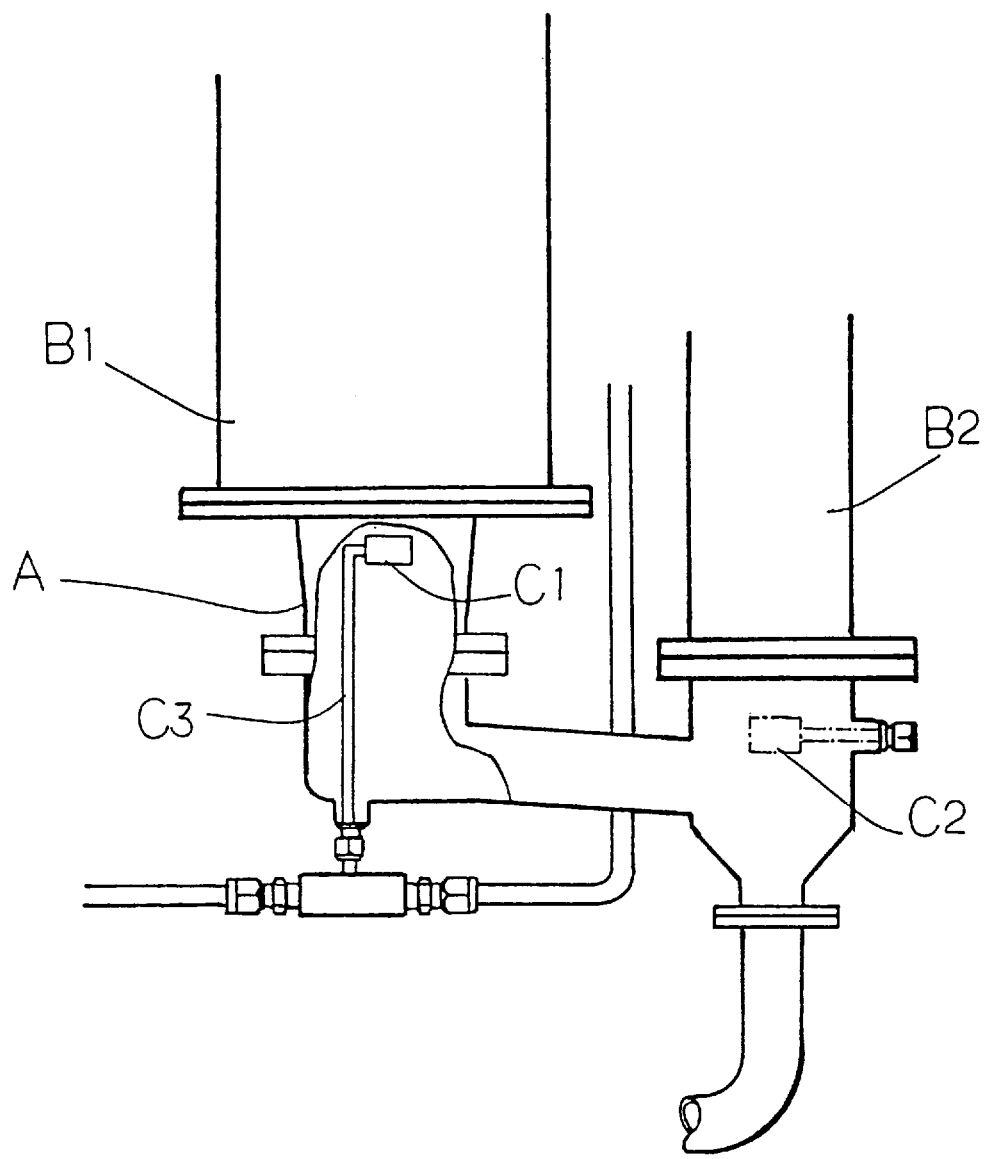
FIG. 1 is a schematic view of the structure of a conventional water discharge module for semi-conductor exhaust treatment apparatus.
Figure 2:
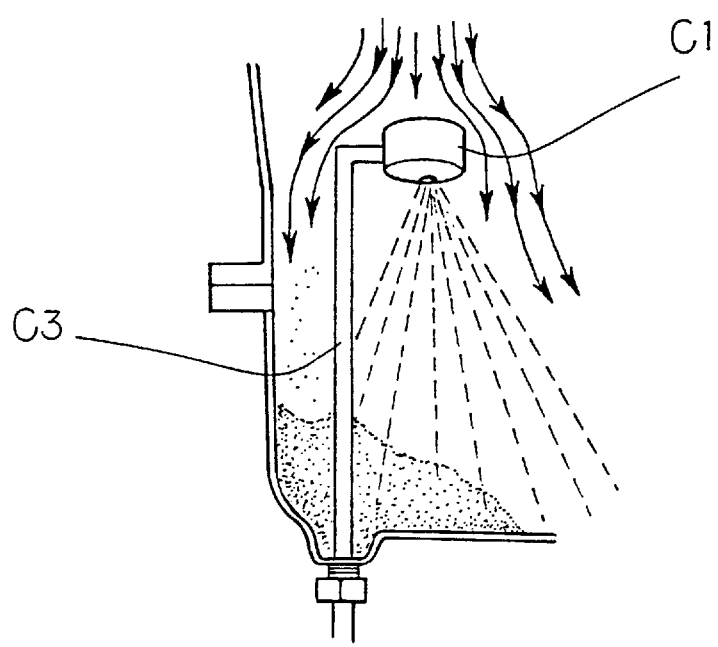
FIG. 2 is a schematic view of a part of the water discharge module in FIG. 1 during operation.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
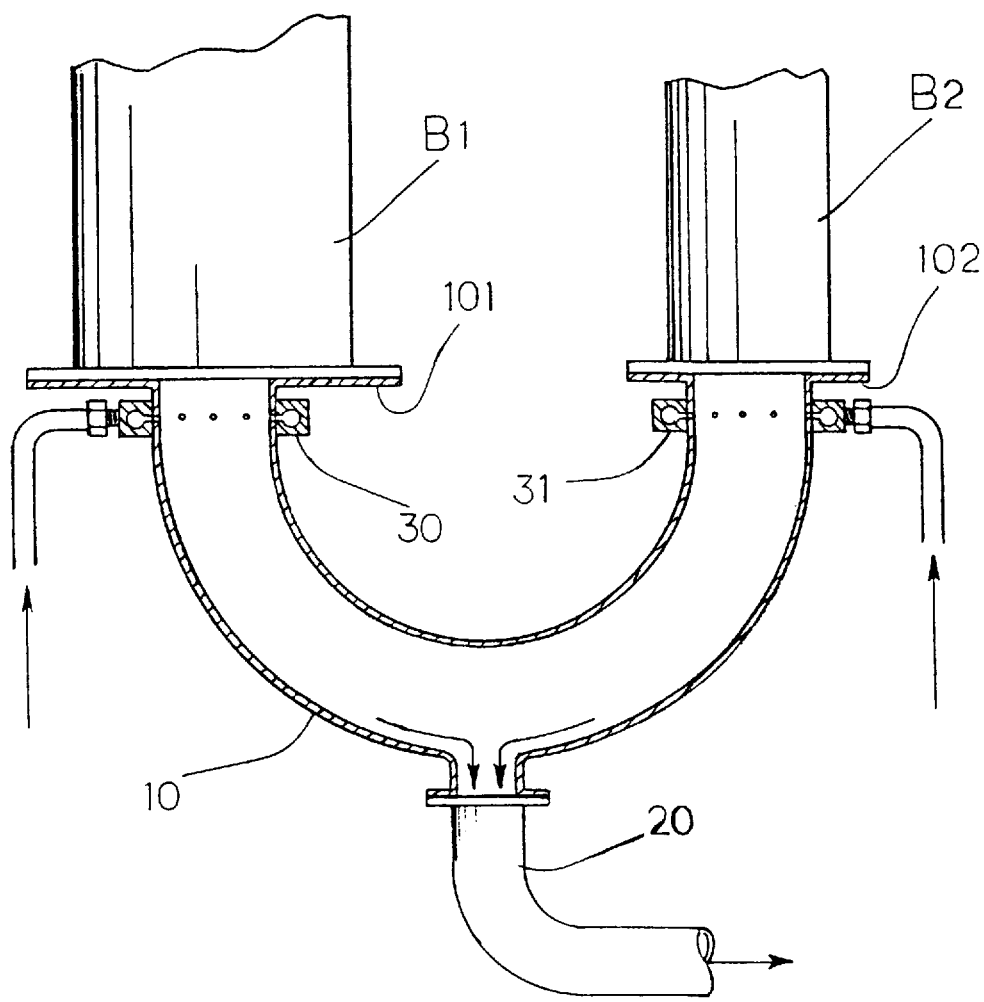
FIG. 3 is a schematic view illustrating the structural relationship of a preferred embodiment of a water discharge module for semi-conductor exhaust treatment apparatus according to the present invention.
Figure 4:
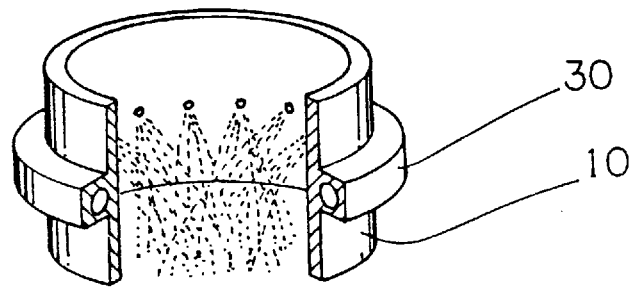
FIG. 4 is a schematic view of the structure of the water discharge module of the present invention.

Referring to FIGS. 3 and 4, the water discharge module according to the present invention essentially comprises a discharge pipe 10 having a curved pipe body and two orifices 101, 102 respectively and sealingly connected to a front reaction chamber B1 of the module and a bottom end of a posterior filter tank B2; a water discharge pipe 20 communicating with a central bottom end of the discharge pipe 10; and two annular nozzles 30, 31 respectively mounted on the two orifices 101, 102 of the discharge pipe 10. During the process of conducting the exhaust from the reaction chamber B1 via the discharge pipe 10 into the posterior filter tank B2, the two annular nozzles 30, 31 will spray water mist from the outer side to the inner side towards the interior of the discharge pipe 10. Since the discharge pipe 10 is curved which follows the characteristics of fluid dynamics, dead corners will not form in the discharge pipe 10 and air currents may flow smoothly downwardly, and waste water carrying exhaust particulates may also flow smoothly downwardly to the water discharge pipe 20 at the central bottom end of the discharge pipe 20 and be completely discharged.

In summary, the water discharge module of the invention is not only simple in construction, it can also overcome the pipe blocking problem with the prior art.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A water discharge module for semi-conductor exhaust treatment apparatus, said water discharge module comprising:

a discharge pipe having a curved pipe body and two orifices at both ends thereof, said two orifices being respectively and sealingly connected to a front reaction chamber of said module and a bottom end of a posterior filter tank;

a water discharge pipe communicating with a central bottom end of said discharge pipe and two annular nozzles respectively mounted at said two orifices of said discharge pipe;

whereby said nozzles spray water mist from an outer side to an inner side toward an interior of said discharge pipe so that exhaust will flow smoothly down said discharge pipe, and waste water carrying particulates will not accumulate on an inner wall of said discharge pipe and will flow smoothly downwardly and be discharged via said water discharge pipe.

* * * * *